May 5, 1942.  O. E. QUAVE  2,281,799
FLOW DISTRIBUTOR
Filed March 30, 1940
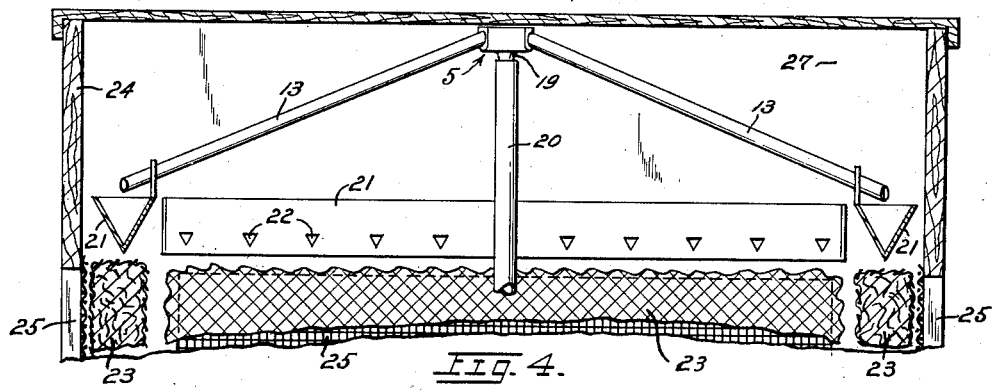
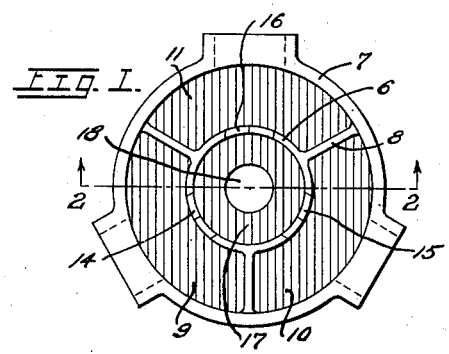
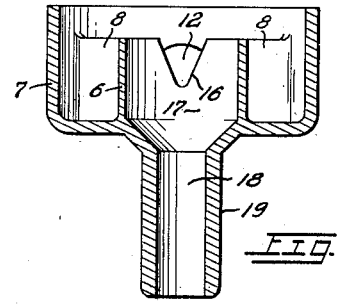
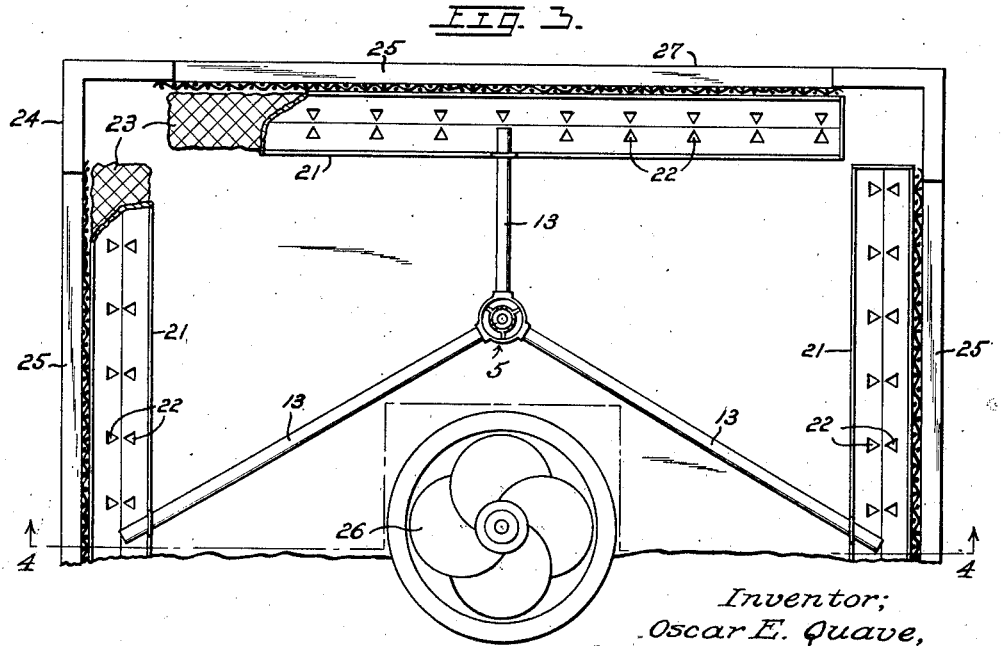
Inventor;
Oscar E. Quave,
by Arthur J. Farnsworth.
Attorney.

Patented May 5, 1942

2,281,799

UNITED STATES PATENT OFFICE 2,281,799

FLOW DISTRIBUTOR

Oscar E. Quave, Huntington Park, Calif., assignor to Utility Fan Corporation, Los Angeles, Calif., a corporation of California Application March 30, 1940, Serial No. 327,085

3 Claims. (Cl. 137—166)

This invention relates to means for distributing flowing liquids, and its objects include; first, to provide an improved device for apportioning and maintaining liquid flow rates to remote points, which may be at different distances from the source, and at different elevations; second, to secure a device of said nature which will function in a substantially normal manner when apparatus to which it is attached has been tipped considerably out of normal position; and, third, to accomplish these aims by simple and inexpensive means. Other objects and advantages will become apparent from the following description.

My purposes have been attained in the manner illustrated in the accompanying drawing, in which—

Figure 1 is a plan view of the central element of a preferred embodiment of the invention;

Figure 2 is a sectional elevation of said element of the invention, taken on the plane indicated by line 2—2 of Fig. 1;

Figure 3 is a fragmentary plan view of a small evaporation cooler, with its cover removed, illustrating an application of the invention; and Figure 4 is a sectional elevation of said cooler with its cover in place, the view being taken on the plane indicated by line 4—4 of Fig. 3.

Similar reference numerals refer to similar parts throughout the several views.

My invention comprises, essentially, a central flow distributor element in the form of a double-walled cup. This is shown by itself in Figs. 1 and 2; and it is indicated in its entirety in the other figures, by the reference numeral 5.

In the preferred embodiment illustrated, the walls of the distributor are cylindrical. Inner wall 6 is of very small diameter with respect to the horizontal dimensions of apparatus with which the invention is to be used. Outer wall 7 is higher than, and considerably spaced from, wall 6. These two walls are co-axial, and connecting partitions 8 divide the intermediate space into three distributing compartments in the form of annular sectors, as shown at 9, 10 and 11 (see Fig. 1). Each of these compartments has an outlet opening 12 (see Fig. 2), into which a conduit 13 is fitted for discharging the contents of the compartment at a remote point. These conduits serve conveniently for adjustably supporting and positioning the flow distributor.

Inner wall 6 is deeply notched, opposite the center of each distributing compartment, to form deep V-shaped weirs 14, 15 and 16; and the flow apportionment function of the distributor is effected by the action of these weirs. Liquid from a primary source (not shown) is supplied to a central reservoir 17, which is defined by wall 6, through a bottom co-axial inlet passage 18 in a downwardly extending nipple 19. A small hose 20 (see Fig. 4) affords ready means for making the necessary connection.

Obviously, if the surface of liquid in reservoir 17 is kept at a constant elevation (which can be done within practical limits in well known ways); the flow coming into the reservoir will be apportioned to the distributing compartments in a definite manner which depends only upon the shape, dimensions and vertical positioning of the weirs.

In the application illustrated in Figs. 3 and 4, conduits 13 conduct apportioned liquid flows to horizontal V-shaped troughs 21. These troughs distribute the apportioned flows, by means of spaced V-shaped orifices 22, upon the tops of burlap bags 23 which are packed with such material as excelsior.

The described apparatus is shown housed within a normally closed cabinet 24. This is provided with screened openings 25 in front of, and in close proximity to, the excelsior bags 23. A suitable fan or blower is conventionally illustrated at 26; whereby air may be forced into the cabinet, and then outwardly therefrom, through bags 23 and screened openings 25 sequentially, for securing the cooling effect which will follow evaporation of the water that is carried by the excelsior.

Provided only that distributor 5 is located sufficiently high, the flow apportionment it makes need have no definite relationship to the distances or elevations of the final fluid delivery points. Hence the lateral positioning of the distributor is largely a matter of convenience. Conduits 13 may vary in length and slope without detriment; and they may be curved or bent as desired, to avoid other apparatus in the cabinet.

In the use of my invention in the manner described, the flow apportionment may be adjusted very readily at any time, by simply bending the distributor supports, as the conduits 13, in an appropriate manner. When once adjusted in this way, the desired apportionment will remain fixed, so long as the slop of the cabinet remains unchanged.

I particularly desire to point out, that the peculiar construction of my distributor permits of making the diameter of reservoir 17 very small in comparison to the lateral dimensions of cabinet 24. Hence accidental or other tipping of the cabinet, within ordinary and reasonable limits, need not seriously interfere with the flow apportionment, if the weirs are kept largely submerged. For example, suppose side 27 of the cabinet measures thirty inches, and that the diameter of reservoir 17 is one inch. Then, if one side of the cabinet is an inch higher than the other (a rather extreme condition), the center of one of the weirs 14 or 15 will be around .03" higher than the other. Variations of head of this small order, ordinarily will not seriously interfere with satisfactor operation of such devices as small evaporation coolers; provided that the operating depth of the weir notches is relatively large with respect to the variations of head. Flow to any of the distributing compartments can never be wholly cut off by any ordinary tipping of the cabinet, if the weir notches are reasonably deep and are kept well submerged.

The invention, of course, is adapted for distributing flowing liquids of many kinds; and it is capable of assuming many forms other than the one illustrated. Therefore I do not limit its scope except as it is defined in the appended claims.

Having thus fully disclosed my invention, I claim:

1. A structure of the class described including a device having a reservoir provided with an inlet, a plurality of spillways, compartments respectively arranged to receive the spillway discharges, and conduits secured to and leading respectively from said compartments to remote points; means at said remote points co-operating with each of said conduits and forming therewith the sole support for the device; said conduits adjacent said remote points being readily bendable so that the reservoir may be inclined as desired with respect to a horizontal plane, whereby the relative volumes of discharge through the spillways may be adjusted.

2. A construction as defined in claim 1 wherein the spillways are in the form of notch weirs having relatively large vertical dimensions.

3. A structure of the class described including a device having a reservoir provided with a central inlet at the bottom, a plurality of spillways at the periphery, compartments respectively arranged to receive the spillway discharges, and conduits secured to and leading divergently from said respective compartments to remote points; means at said remote points co-operating with each of said conduits and forming therewith the sole support for the device; said conduits, by virtue of their relative length and the character of their material, being readily bendable so that the reservoir may be inclined as desired with respect to a horizontal plane, whereby the relative volumes of discharge through the spillways may be adjusted.

OSCAR E. QUAVE.